(12) United States Patent
Carter

(10) Patent No.: US 6,983,301 B1
(45) Date of Patent: Jan. 3, 2006

(54) BACKGROUND PROCESSING DEFERMENT FOR COMPUTER TELEPHONY

(75) Inventor: George E. Carter, Santa Clara, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/497,279

(22) Filed: Feb. 2, 2000

(51) Int. Cl.
*G06F 15/16* (2006.01)

(52) U.S. Cl. .................... 709/200; 709/201; 709/202; 709/227

(58) Field of Classification Search ........ 709/226–228, 709/200–202, 238; 370/351–352; 379/201.01–201.04, 379/88.17, 93.23, 265.09
See application file for complete search history.

(56) References Cited

U.S. PATENT DOCUMENTS

| | | | | |
|---|---|---|---|---|
| 5,327,486 A | * | 7/1994 | Wolff et al. ............... | 379/93.23 |
| 5,404,536 A | * | 4/1995 | Ramakrishnan et al. .... | 710/220 |
| 5,542,088 A | * | 7/1996 | Jennings et al. ............ | 718/103 |
| 5,819,046 A | * | 10/1998 | Johnson ....................... | 709/227 |
| 5,862,337 A | * | 1/1999 | Gray ........................... | 709/224 |
| 5,878,130 A | | 3/1999 | Andrews et al. ............ | 379/265 |
| 5,999,525 A | | 12/1999 | Krishnaswamy et al. ... | 370/352 |
| 5,999,609 A | | 12/1999 | Nishimura ................... | 379/201 |
| 5,999,965 A | | 12/1999 | Kelly .......................... | 709/202 |
| 6,009,469 A | | 12/1999 | Mattaway et al. .......... | 709/227 |
| 6,011,844 A | | 1/2000 | Uppaluru et al. ........... | 379/220 |
| 6,069,890 A | * | 5/2000 | White et al. ................ | 370/352 |
| 6,108,028 A | * | 8/2000 | Skarbo et al. ........... | 348/14.03 |
| 6,112,225 A | * | 8/2000 | Kraft et al. ................. | 709/202 |
| 6,145,083 A | * | 11/2000 | Shaffer et al. .............. | 713/201 |
| 6,170,016 B1 | * | 1/2001 | Nakai et al. ................ | 709/232 |
| 6,339,644 B1 | * | 1/2002 | O'Neil et al. .............. | 709/227 |
| 6,360,336 B1 | * | 3/2002 | Christensen et al. ......... | 714/47 |
| 6,384,853 B1 | * | 5/2002 | Shaffer et al. .............. | 345/867 |
| 6,418,462 B1 | * | 7/2002 | Xu ............................. | 709/201 |
| 6,430,289 B1 | * | 8/2002 | Liffick ........................ | 370/352 |
| 6,463,457 B1 | * | 10/2002 | Armentrout et al. ........ | 709/201 |
| 6,594,253 B1 | * | 7/2003 | Sallberg et al. ............. | 370/379 |
| 6,711,241 B1 | * | 3/2004 | White et al. ............. | 379/88.17 |
| 6,791,974 B1 | * | 9/2004 | Greenberg ................... | 370/352 |

* cited by examiner

*Primary Examiner*—Bharat Barot

(57) ABSTRACT

Techniques for improving the audio of computer telephony calls are provided. The execution of background computer processes can be deferred during computer telephony calls so that the background processes will not take up processing resources and thereby reduce the audio quality. Additionally, background processes can be resumed if there have not been any computer telephony calls made or received for a specific amount of time.

22 Claims, 10 Drawing Sheets

BACKGROUND PROCESSING DEFERMENT FOR COMPUTER TELEPHONY

BACKGROUND OF THE INVENTION

The present invention relates to computer telephony systems. More particularly, the invention relates to deferring background processing to improve the quality of computer telephony audio.

Computers continue to permeate technology areas because they can offer significant advantages in terms of convenience and flexibility over non-computer technologies. Telephony systems are an example where computers are increasingly being utilized to add features and lower costs.

Although computer telephony can provide users with greater convenience and flexibility, conventional computer telephony have problems related to what has become known as "choppy audio." Choppy audio refers to the variable and abnormal delay of segments of sound delivered to the user. These delays can result in annoying gaps in the audio heard by the listener as opposed to the more natural continuous sound that is heard on conventional telephones over circuit-switched networks.

One cause of choppy audio is packet loss. Packet loss is typically caused by highly overloaded processors and network links and by error prone links. These causes should abate in importance as faster processors and higher bandwidth links are installed and as noise-prone analog links are replaced by digital links.

Network delays are another cause of choppy audio. In recent years, a jitter buffer has been used to mask the impacts of network delays on sound quality. A jitter buffer buffers the sound by inserting delays to impose a consistent network delay, as opposed to the unpredictable delays caused by the network in the absence of this jitter buffer. Many users find that a consistent delay is preferable to choppy audio.

Another cause of choppy audio is misbehavior of video cards. Striving for the best benchmarks for video cards, video card manufacturers often design the video cards to monopolize the bus (e.g., PCI bus) so that there is not enough of this resource available for audio use to prevent choppy audio. A less aggressive video card can significantly decrease this cause.

Although the previously described solutions to choppy audio can be utilized alone or together to reduce choppy audio, choppy audio can still be caused by client processing delays. Many computer telephony clients are based on general purpose platforms such as Windows-based and Unix-based workstations that are used for multiple applications. There is now a large and rapidly growing number of applications on these platforms that run potentially resource-intensive programs in the background (i.e., not under the immediate interactive control of the computer user). Examples of background processes include virus checking processes, word processing processes that save recent changes, email processes that check for mail, processes that backup data, and the like.

When background processes execute on a client workstation during a computer telephony call, choppy audio may result and the results can be particularly severe when several of these background processes are running at the same time. It would be beneficial to have techniques for reducing choppy audio caused by client processing delays in computer telephony systems.

SUMMARY OF THE INVENTION

The present invention provides innovative techniques for improving the audio quality of computer telephony calls. Choppy audio can be reduced or eliminated by deferring execution of background processes during telephony calls. The invention can be utilized alone or in conjunction with other techniques designed to improve the audio of telephony calls. Several embodiments of the invention are described below.

In one embodiment, the invention provides a computer-implemented method of processing a computer telephony call. Execution of background computer processes are deferred and a computer telephony call is processed. The deferment of background processes can be performed when a computer telephony application is executed, before making or receiving a computer telephony call, or during the computer telephony call. In a preferred embodiment, an inhibit list indicates background processes that will have their execution deferred, and an uninhibit list is utilized to reverse the process by enabling execution of background processes.

In another embodiment, the invention provides a computer-implemented method of processing a computer telephony call where execution of background processes is deferred. If there have not been any computer telephony calls for a predetermined time, execution of background processes is enabled. Background processes can be deferred once again before making or receiving a computer telephony call.

Other features and advantages of the invention will become readily apparent upon the review of the following description in association with the accompanying drawings. In the drawings, the same or similar structures will be identified by the same reference numerals.

DETAILED DESCRIPTION OF EMBODIMENTS

In the description that follows, the present invention will be described in reference to embodiments that defer computer background processes during computer telephony calls on an operating system that utilizes multi-tasking. More specifically, the embodiments will be described in reference a preferred embodiment that operates in a conventional operating system, such as Microsoft Windows operating system. However, the invention is not limited to specific operating systems, deferred processes, implementations, or architecture described herein, as the invention can be implemented in different ways. Therefore, the description of the embodiments that follows is for purposes of illustration and not limitation.

Figure 1:
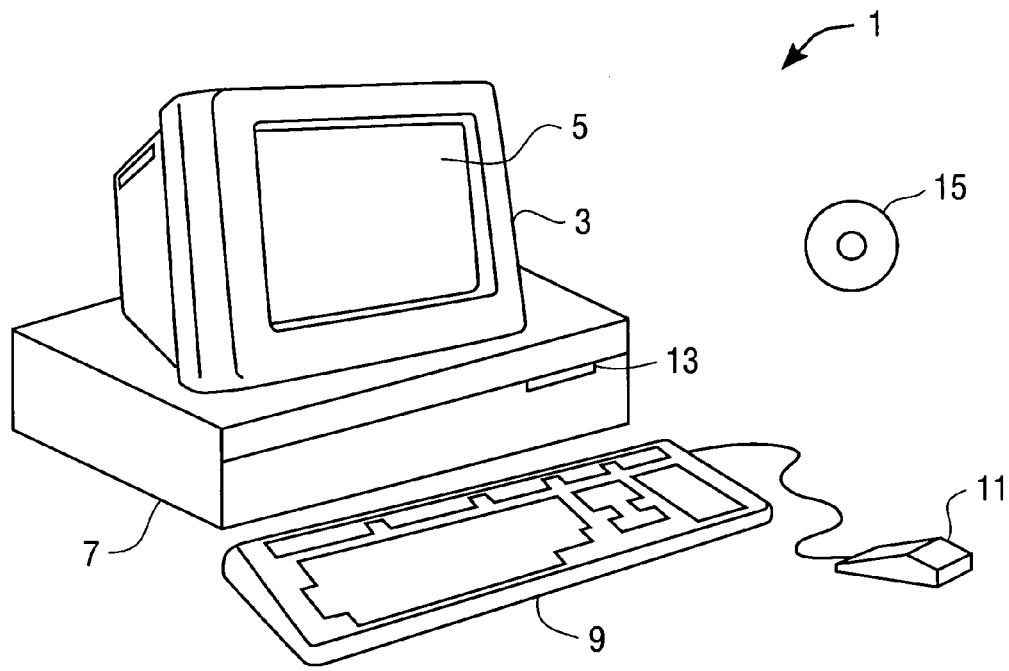
FIG. 1 illustrates an example of a computer system that can be utilized to execute the software of an embodiment of the invention and use hardware embodiments.

FIG. 1 illustrates an example of a computer system that can be used to execute the software of an embodiment of the invention and use hardware embodiments. FIG. 1 shows a computer system 1 that includes a display 3, screen 5, cabinet 7, keyboard 9, and mouse 11. Mouse 11 (or alternative input/output devices) can have one or more buttons for interacting with a graphical user interface (GUI). Cabinet 7 houses a CD-ROM drive 13, system memory and a hard drive (see FIG. 2) which can be utilized to store and retrieve software programs incorporating computer code that implements aspects of the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
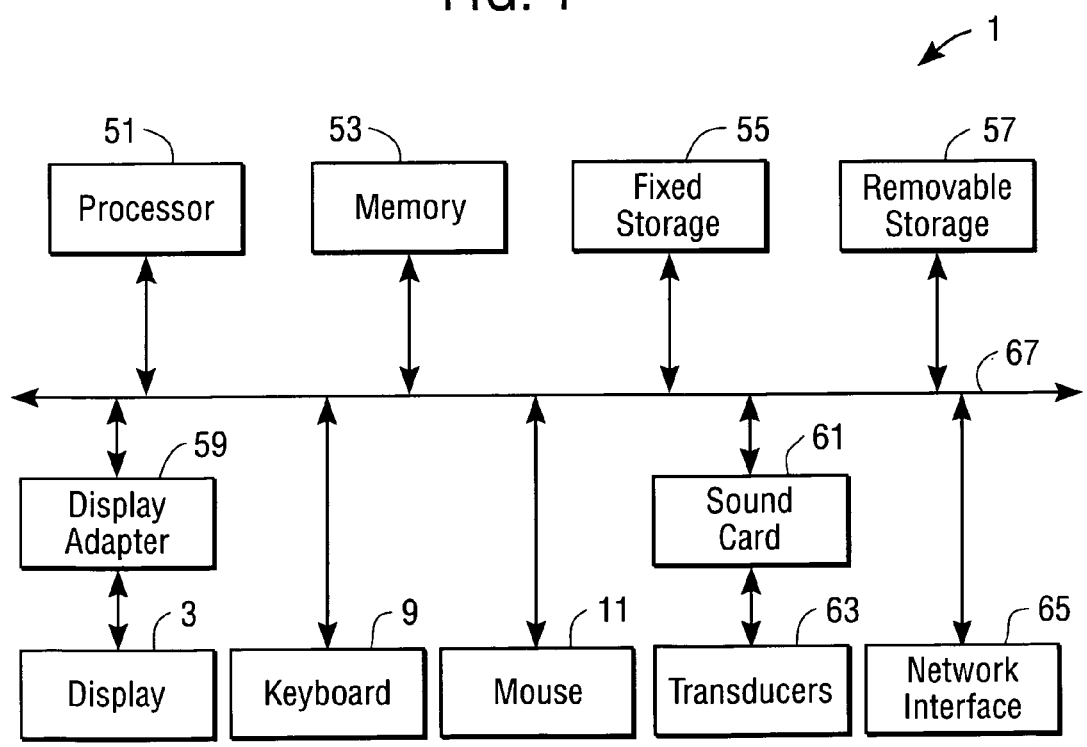
FIG. 2 illustrates a system block diagram of the computer system of FIG. 1.

FIG. 2 shows a system block diagram of computer system 1 used to execute a software of an embodiment of the invention or use hardware embodiments. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, transducers 63 (speakers, microphones, and the like), and network interface 65. The network interface may provide the communication to the computer telephony network. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and/or display adapter. Computer system 1 shown in FIG. 2 is but an example of a computer system suitable for use with the invention. Other computer architectures having different configurations of subsystems can also be utilized.

Conventional operating systems are multi-tasking, meaning that more than one task or process can be executing on the computer system at the same time. The computer processor executes a process for a relatively small (e.g., tens of milliseconds) amount of time and then switches to a different process so that it appears that multiple processes are executing at the same time. Although the above has focused on the more conventional single processor architecture, multi-tasking may still be applied to multiprocessor systems.

Background computer processes are those processes that are not under the immediate interactive control of the user. Examples of background processes include file inversion routines to build indexes that permit fast document searches (e.g., FindFast feature of Office 97 for WINDOWS), programs that continuously search computer disks for viruses, programs that periodically save word processing or spreadsheet files to disk, programs that check for mail and sort it into different categories, programs designed to backup local data from work stations onto central servers, and the like. Background processes can be very processor-intensive so that if they are executed during a computer telephony call, choppy audio may result. This problem can be particularly severe when several background processes are executing at the same time. One aspect of the invention is that some or all of the background processes are deferred from executing during a computer telephony call so that choppy audio can be reduced or eliminated.

Figure 3:
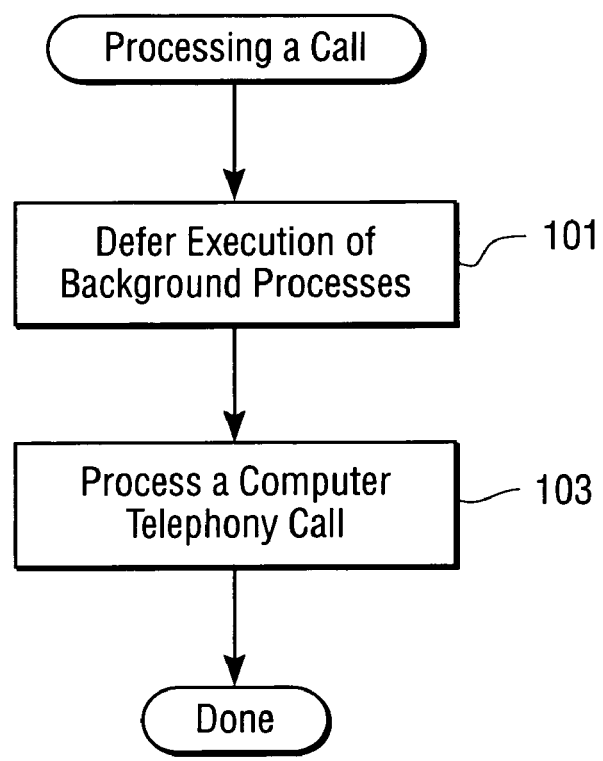
FIG. 3 shows a flowchart of a method of processing a computer telephony call where the execution of background processes is deferred.

FIG. 3 shows a flowchart of a general method of processing a computer telephony call where background processes are deferred from executing. At a step 101, execution of background processes are deferred. Deferring execution of background processes can be performed when a computer telephony application is executed, before making or receiving a computer telephony call, and/or during the computer telephony call. As will be described in more detail below, the background processes can be identified in an inhibit list that includes the name of the background process and information on how the execution of the background process is deferred.

A computer telephony call is processed at a step 103. The computer telephony call can be processed with better audio results because the execution of background processes has been deferred. Accordingly, choppy audio during the computer telephony call can be reduced or eliminated.

Figure 4:
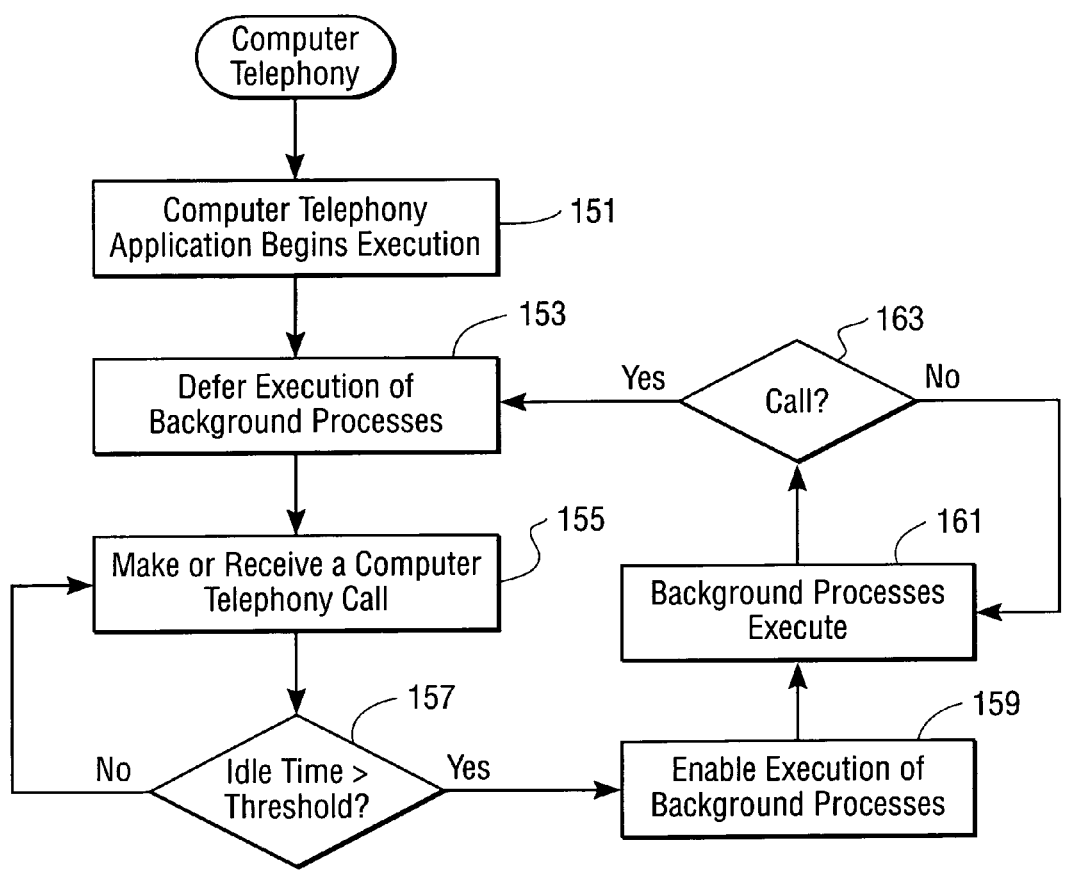
FIG. 4 shows a flowchart of a method of computer telephony where background processes are enabled for execution after a predetermined time of no computer telephony calls.

Another aspect of the invention is that if there are no computer telephony calls for a predetermined time, the execution of background processes can be enabled (or re-enabled). FIG. 4 shows a flowchart of a method of computer telephony where the execution of background processes is enabled in such a manner. At a step 151, a computer telephony application begins execution. The computer telephony application allows the user to make and receive telephone calls through the computer system over a network.

Initially, at a step 153, the execution of background processes is deferred. The execution of background processes is deferred in order to achieve better audio quality during a computer telephony call as described above. The user makes or receives a computer telephony call at a step 155. When the computer telephony call is over, a timer is begun in order to determine how long the computer telephony application is idle between calls.

The idle time between computer telephony calls can be compared to a threshold or predetermined time at a step 157. If the idle time is less than the threshold, the computer telephony application proceeds to step 155 to allow the user to make or receive a computer telephony call. If, however, the idle time is greater than the threshold, execution of background computer processes is enabled at a step 159. The names of the background processes and information on how to enable execution of the background processes can be stored in an uninhibit list. Once execution of background processes is enabled, the background processes can execute at a step 161. The background processes may periodically execute until it is determined that a computer telephony call is made or received at a step 163. When a computer telephony call is made or received, the computer telephony application proceeds to step 153 in order to defer execution of background processes during the computer telephony call.

In many environments, the computer telephony application will be executed when the computer system is turned on. The performance of the computer system may be compromised if background processes are deferred indefinitely, so the above aspect of the invention allows background processes to execute if there has not been a computer telephony call for a predetermined time (e.g., ten minutes).

Figure 5:
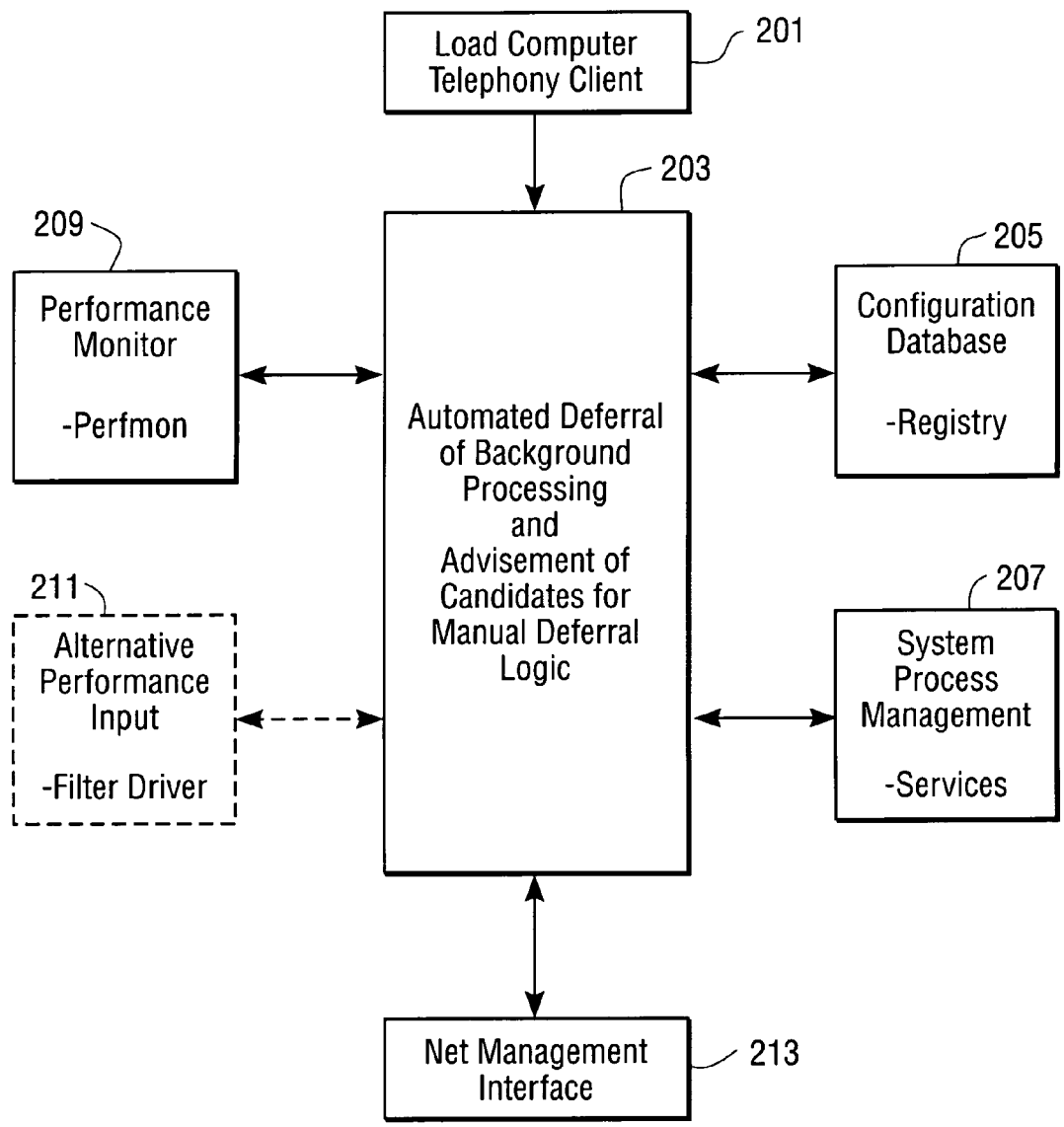
FIG. 5 shows a block diagram of components according to one embodiment of the invention.

FIG. 5 shows a block diagram of components in one embodiment. Block 201 indicates that a computer telephony client is loaded. The computer telephony client can be loaded when the computer system is powered up or manually by the user such as by clicking on an icon. The computer telephony client includes a thread 203 that performs automated deferral of background processing and advisement of candidates for manual deferral logic. In one embodiment, thread 203 can check a list of known deferrable background computer processes that have the potential of interfering with telephony client sound quality and then determine which of these are installed, configured and have the potential of running. For example, the configuration database 205 of the system called the Registry in the Windows system can be analyzed.

Deferring execution of background processes can be performed in a number of different ways depending on the background process or program and the operating system. Some programs can be deferred by manipulating values in configuration database 205. Other programs can be deferred by utilizing calls to system process management 207 such as the Windows NT service calls. Non-Windows operating systems will typically have generic analogs to one or more of these facilities that can be used for this purpose. Additionally, other techniques, such as batch file execution as will be described below, can be utilized to defer execution of background processes.

In one embodiment, a performance monitor 209 is consulted during computer telephony calls to determine the processing resources that are utilized by any processes that are executing during computer telephony calls. For example, perfmon in a Windows system can be run and utilized to monitor the processor time that each process is utilizing. The background processes that were executing during computer telephony calls and the processing resources they utilized can be shown to a user so that the user can subsequently defer execution of these background processes in order to improve audio quality of computer telephony calls. In environments where a standard performance monitor is not available, an alternative performance input 211 can be utilized to measure processing resources that background processes utilize. For example, a filter driver can be written that monitors the hard drive access by each background process in order to make an estimate of the processing requirements of the background process.

As mentioned above, an idle time can be utilized to enable execution of background processes if there have not been any computer telephony calls. A network management interface 213 can be accessed by a user in order to view or modify the idle time. Additionally, the network management interface can allow users to inspect the list of background processing candidates for manual deferral.

In one embodiment, an inhibit list that lists the background processes that are deferred during computer telephony calls is maintained. The inhibit list can also include information (e.g., computer instructions) on how to defer each background process. Similarly, an uninhibit list can list the deferred background processes and include information on how to resume execution of the background processes. The specific implementation of the inhibit and uninhibit list can be varied widely according to the implementation and the invention should not be limited in any way by the embodiments described herein. For example, the inhibit and uninhibit lists and information therein can be combined, deleted, re-ordered, and added without departing from the spirit and scope of the invention.

In embodiments that utilize a registry, it may be beneficial to include a flag (e.g., a RegMod flag) that indicates that a registry change has been made since the last start-up of the computer telephony application. Additionally, the flag can also indicate that this is the first time that the computer telephony application has been executed. When the computer telephony client is executed, the flag can be checked to see if it has been set. If the flag is set, new inhibit and uninhibit lists are constructed, and the new inhibit list is utilized to defer execution of background processes. If the embodiment is utilizing a flag to indicate when the registry is modified, a thread can monitor the registry and set the flag if modifications are made to the registry. If the flag was not set, the existing inhibit list is utilized to defer execution of background processes.

The inhibit and uninhibit lists are typically generated by inspecting configuration files, configuration databases, process management facilities, and the like of the operating system. The information on how to defer execution of background processes also typically includes a modification of one or more of the facilities, which may vary depending on the specific background process that is deferred. There are many common background processes (Microsoft FindFast that indexes files in the background) that can be readily determined as executing on the current computer system and the way for deferring execution can be known and retrieved, such as from a database of common background processes or integrated into the computer code. Additionally, as will be described in more detail below, embodiments can allow users to define batch files that specify instructions for deferring execution of background processes.

When there have been no computer telephony calls for a predetermined time (e.g., ten minutes), the uninhibit list can be utilized to allow execution of background processes. When a subsequent computer telephony call is made or received, the inhibit list can be utilized to once again defer execution of the background processes. The calculation of the idle time can be performed in any number of ways known to those of skill in the art including the utilization of flags, timers, interrupts, and the like.

Now that the general operation of the invention has been described, details of one specific embodiment are described. In this embodiment, each known background process is assigned an identifier or code, which are stored in the inhibit and uninhibit lists. By analyzing the codes, the specific steps that are needed to be performed in order to defer execution (and resume execution) of the background process can be identified and performed. Additionally, codes can be utilized to indicate that a background process is deferred (or resumed) by execution of a user-defined batch file.

Figure 6:
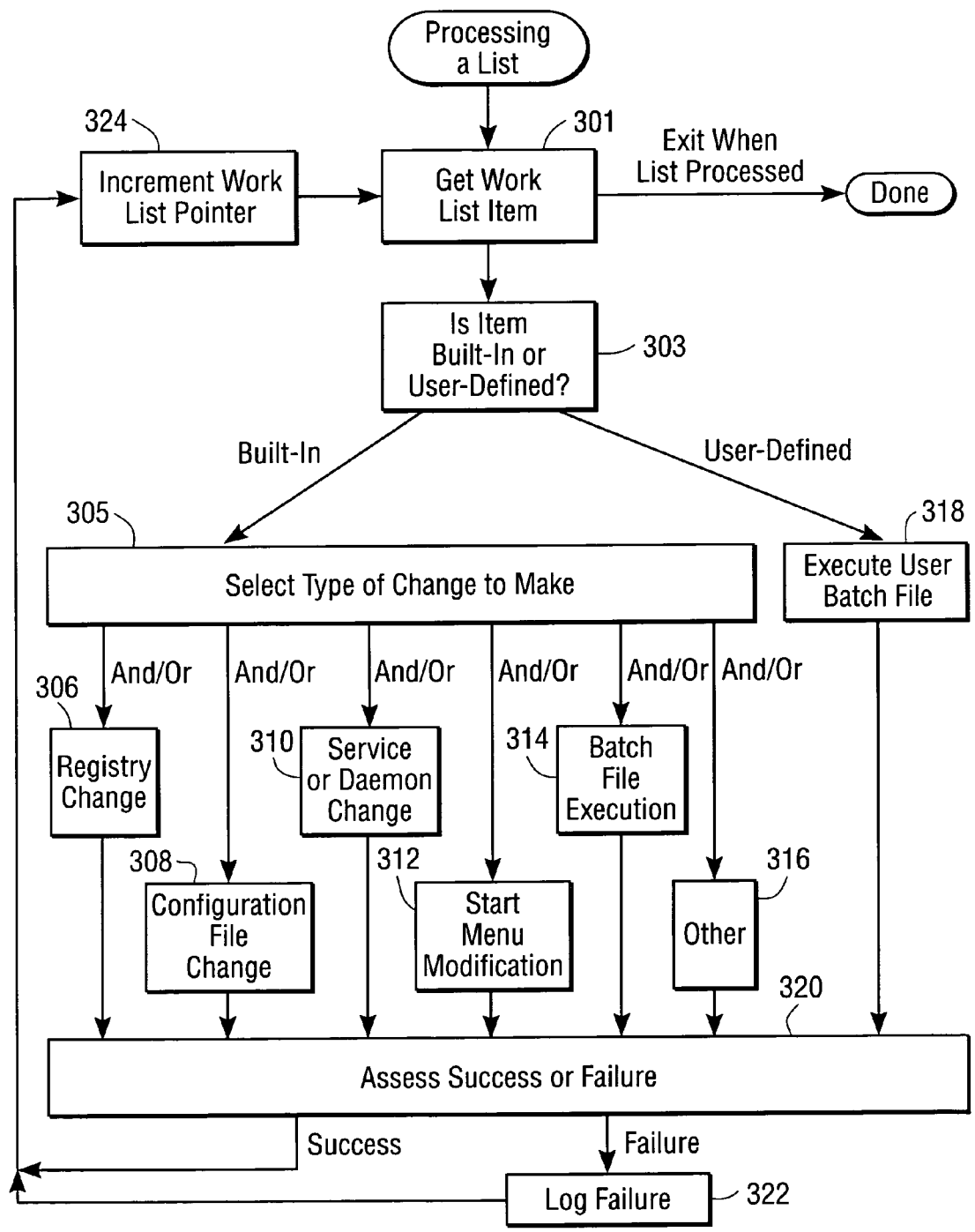
FIG. 6 shows a flowchart of a method of processing a list of computer background processes to be inhibited or uninhibited, according to an embodiment of the invention.

FIG. 6 shows a flowchart of a method of processing a list, which can be an inhibit list, uninhibit list, or a combination of the two. At a step 301, an item is retrieved from the list where the item corresponds to a background process. It is then determined at a step 303 whether the item is a built-in item or a user-defined item. By "built-in", it is meant that the background process is known and has been identified by a corresponding code. User-defined background processes are those that will be deferred (and resumed) by executing a user-defined batch file. Thus, user-defined background processes can be any background process, including those that are built-in that the user is providing the specific instructions on how to affect execution of the background process.

If the background process is built-in, the specific change to be made is selected at a step 305. The change or changes can be any one or more of the following steps. A step 306 indicates that a Registry change can be made. A configuration file change is indicated at a step 308. At a step 310, a service or daemon change can be made. Start menu modifications can be performed at a step 312. At a step 314, a batch file can be executed (e.g., the batch file may have been obtained from the manufacturer of the background process). Lastly, a step 316 indicates that other changes can be made, because the deferral of background processes can be dependent upon the background processors and the operating system. Thus, other techniques of deferring background processes can be included with the invention.

If the background process was user-defined, a user-defined batch file can be executed in a step 318 in order to defer or resume execution of the background process. By allowing user-defined batch files, embodiments of the invention can provide users with great flexibility in customizing their system for their specific applications.

At a step 320, it is determined whether the manipulation of the background process was a success or failure. If it was a success, the rest of the list is processed at step 324. If it was a failure, the failure can be logged at a step 322 and the rest of the list is processed at step 324. Therefore, if for some reason a background process can not be deferred, this can be logged for the user but the computer telephony application can proceed and receive the audio quality benefits of the deferral of other background processes.

In step 324, a pointer to the current item in the list is incremented to the next item so that the next item can be retrieved at step 301. Once all of the items in the list are processed, the processing of the list is complete as shown. The following will discuss the changes in steps 306–316 in more detail.

In order to make a change to the Registry (a database of registry keys and their associated values) as indicated in step 306, the value associated with one or more keys can be modified. For example, if a registry key indicates the interval in which the background process should execute (e.g., Microsoft Findfast), the interval value can be set to a value that defers execution indefinitely or for a significantly long period of time such that it will not likely interfere with computer telephony calls.

Configuration file changes as specified in step 308 can include values that specify whether or not the process will be executed in the background. For example, depending upon the specific application, there may be a Boolean value that indicates whether the process should be executed in the background. Toggling this value can defer execution of the background process.

Figure 7:
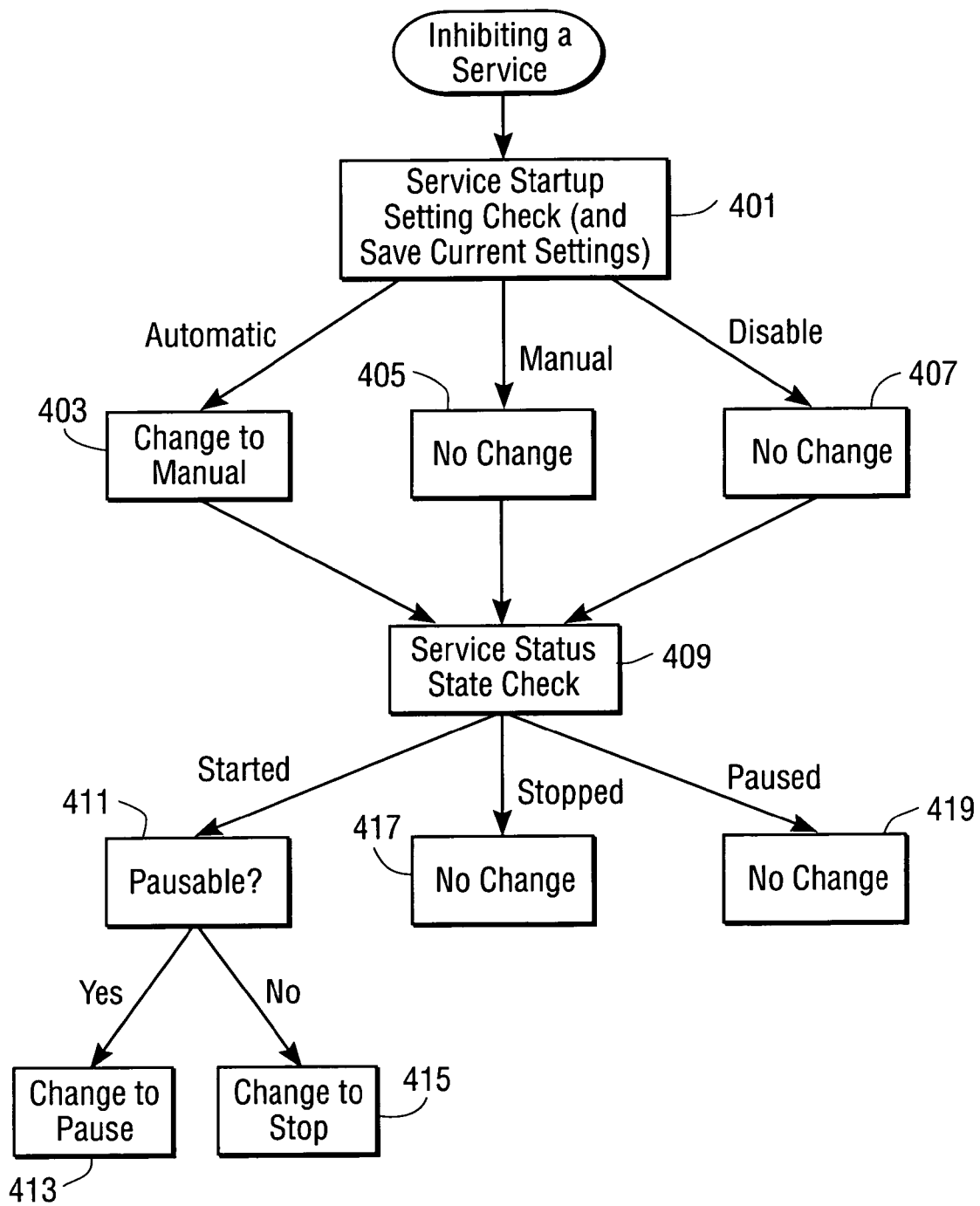
FIG. 7 shows a flowchart of a process of inhibiting a service, according to an embodiment of the invention.

FIG. 7 shows a flowchart of a process of inhibiting a Windows service, such as may be performed at step 310. At a step 401, the current service start-up setting is saved and checked to determine whether it is automatic, manual or disable. If the service start-up setting is automatic, the setting is changed to manual at a step 403. Otherwise, if the setting is manual or disable, the setting is not changed at step 405 or 407.

At a step 409, the service status state is checked to determine if it is started, stopped, or paused. If the state is started, it is determined if the service is pausable at a step 411. If the service is pausable, the state is changed to pause at a step 413. Otherwise, if the service is not pausable, the state is changed to stop at a step 415. If the service status state is determined in step 409 to be stopped or paused, the state is not changed at step 417 or 419.

In other words, if the service start-up setting indicates that its operations will be determined automatically, the setting is changed to manual so that the service can be manually controlled. If the service has already been started, it is determined if it is pausable so it can be paused, otherwise it will be stopped.

Figure 8:
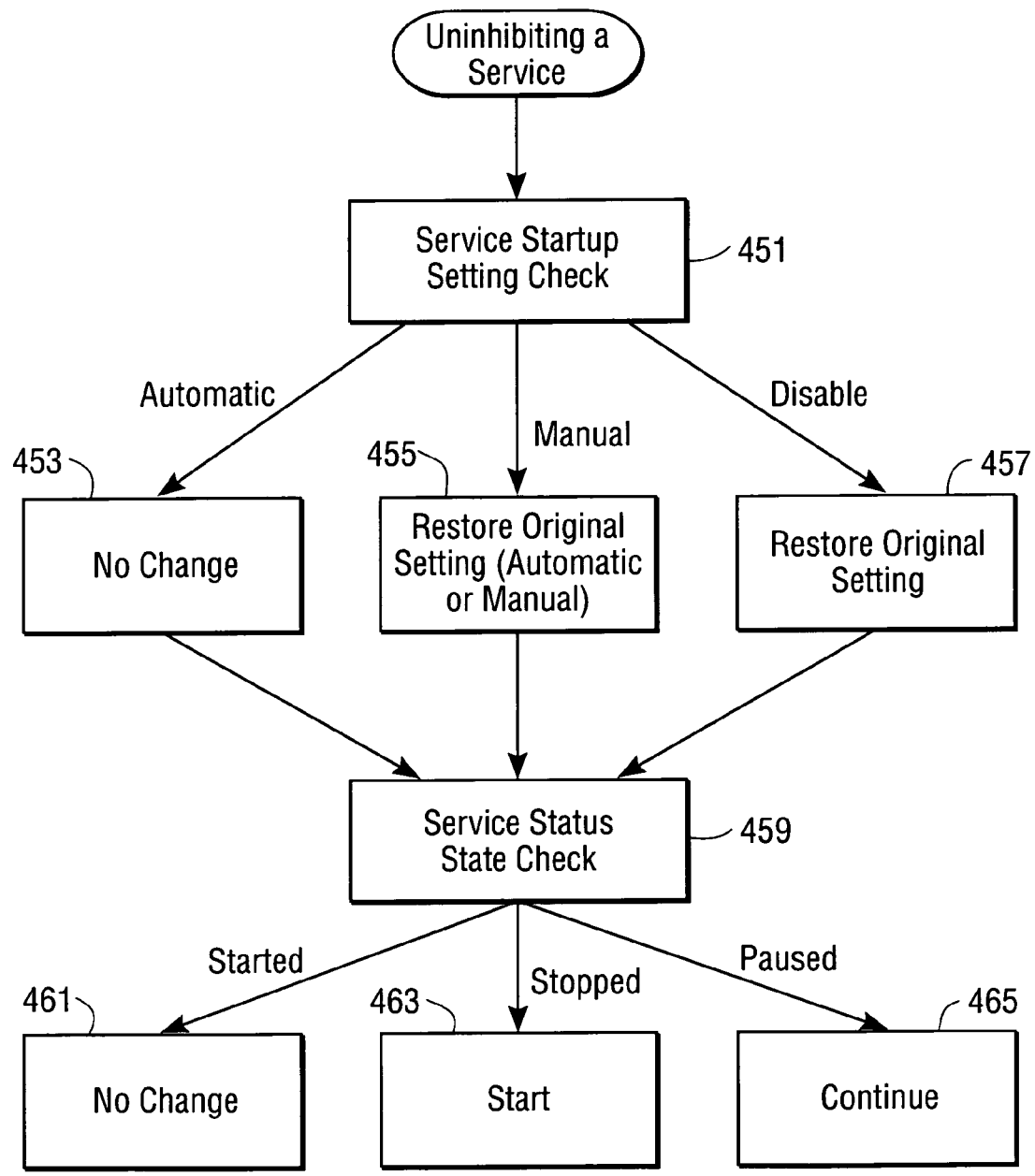
FIG. 8 shows a flowchart of a process of uninhibiting a service, according to an embodiment of the invention.

FIG. 8 shows a flowchart of a process of uninhibiting a service that can be performed at step 310. The flowchart is in many respects a reversal of the flowchart of FIG. 7, which is as would be expected. At a step 451, the service start-up setting is checked to determine if it is automatic, manual or disabled. If the setting is automatic, no change is made at a step 453. Otherwise, if the setting is manual or disabled, the original setting is restored at step 455 or 457, respectively. The original setting was saved at step 401 in FIG. 7.

At a step 459, the service status state is checked to determine if it is started, stopped, or paused. If the state is started, no change is made at a step 461. If the state is stopped, the state is set to start at a step 463. Lastly, if the state is paused, the state is set to continue at a step 465. In other words, the service is uninhibited by generally returning the start-up setting to its original value and manipulating the state in order to allow execution of the background process to continue.

It should be noted that some applications, for example antivirus applications, can include multiple background processes. If the background processes are to be deferred and resumed utilizing service changes, the flowcharts shown in FIGS. 7 and 8 may be performed for each of the component background processes.

A start menu modification as shown at step 312 of FIG. 6 can include modifying the start menu so that it no longer activates the background process. This way, the background process can be managed through other mechanisms (e.g., a batch file at step 314 or other mechanism at step 316). Accordingly, the start menu modification may typically be used in conjunction with another technique for deferring and resuming execution of background processes.

Figure 9A:
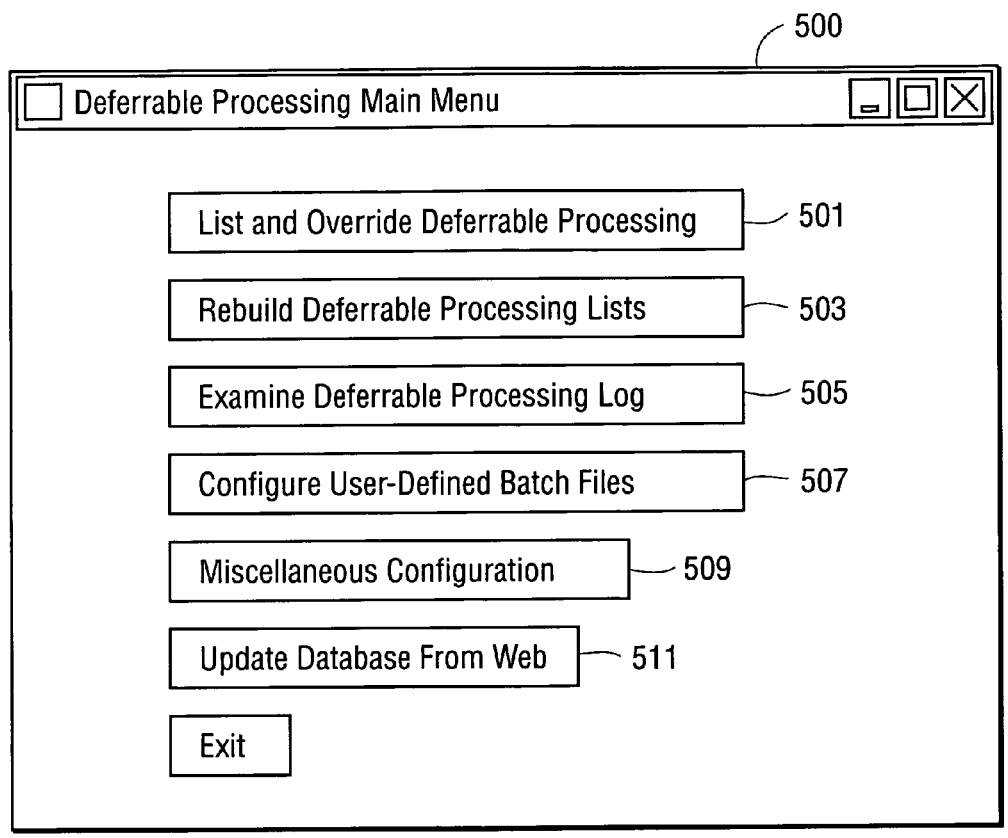
FIGS. 9A–9G show examples of windows in a graphical user interface (GUI) that can be utilized, according to embodiments of the invention.
Figure 9B:
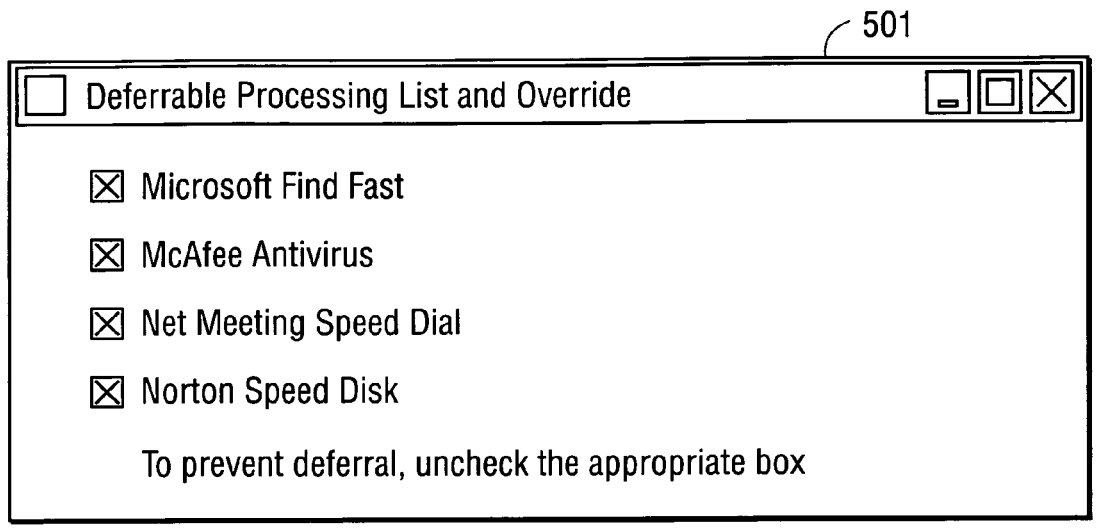

FIGS. 9A–9G show sample windows from an embodiment of the invention. FIG. 9A shows a main menu 500 that allows a user to view and modify the configuration of deferring background processes. A menu item 501 allows the user to list and override deferrable background processes on the current computer system. An example of a window that can be displayed upon selection of menu item 501 is shown in FIG. 9B. As shown in FIG. 9B, a list of background processes that can be potentially executed on the current computer system is displayed. Check boxes are utilized to show whether each background process will be deferred from executing. Additionally, the check boxes allow the user to override (and change) the setting for a specific background process.

Figure 9C:
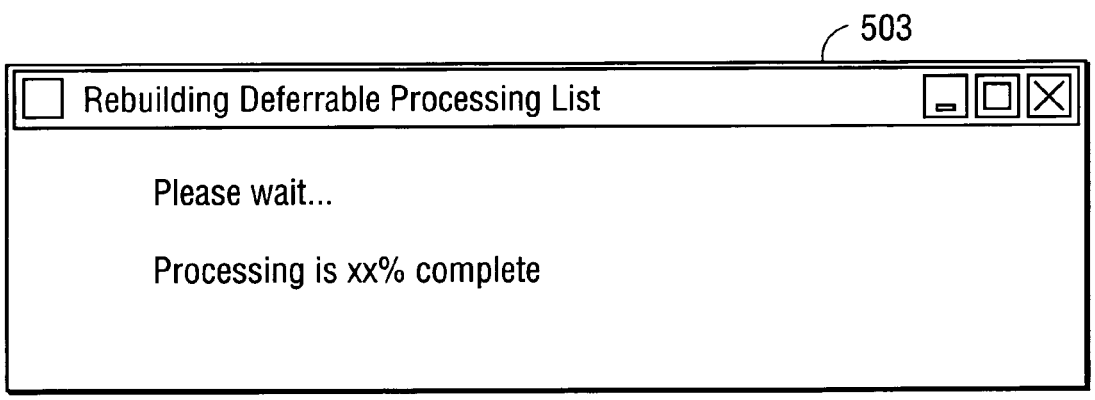

Returning to FIG. 9A, a menu item 503 allows a user to rebuild the lists of deferrable background processes on the current computer system. As described above, the lists can be built by examining the configuration files, configuration databases, services, and the like on the current computer system. While the lists are being rebuilt, a window as shown in FIG. 9C may be displayed in order to provide the user with the progress.

Figure 9D:
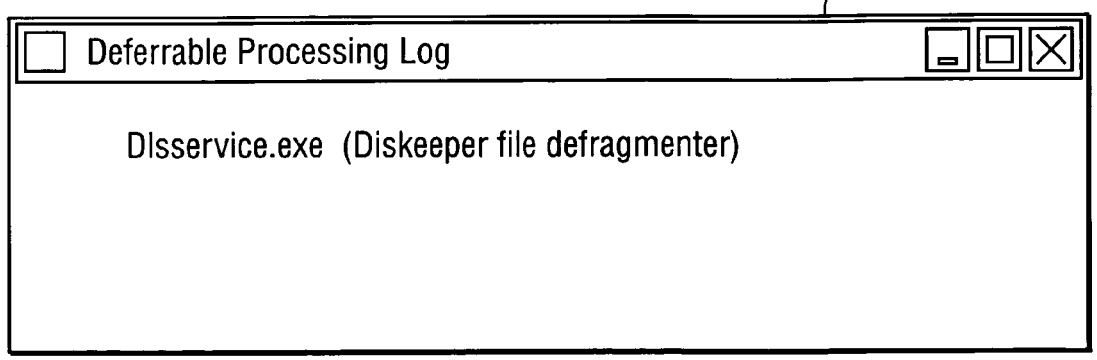

A menu item 505 in FIG. 9A allows the user to examine the deferrable processing log. The log can include the names of background processes that executed while computer telephony calls were occurring and the processing resources that they utilized. Additionally, the processing log can show whether there were any errors in deferring or resuming background processes. FIG. 9D shows an example of a window that may be utilized to show the processing log.

Figure 9E:
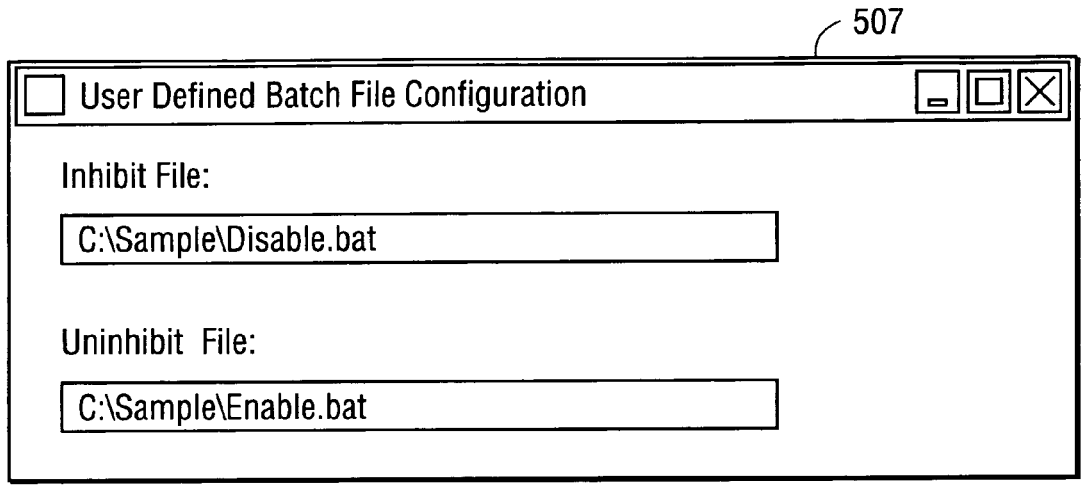

A menu item 507 in FIG. 9A allows the user to configure user-defined batch files. As shown in FIG. 9E, a window allows the user to input the path and file name of an input file and an uninhibit file. Additionally, a similar window can be utilized to specify batch files for specific background processes.

Figure 9F:
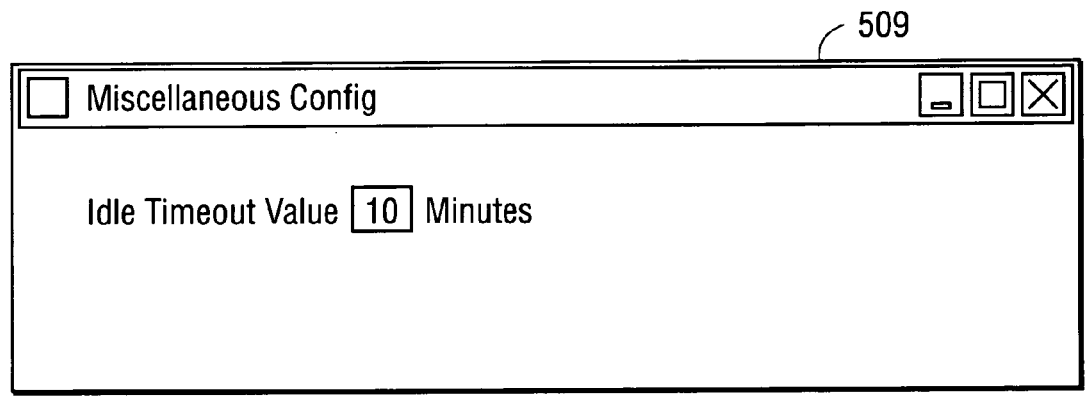

Again referring to FIG. 9A, a menu item 509 allows the user to perform miscellaneous configuration. As an example, the miscellaneous configuration can include the idle time that must pass before background processes will have their execution resumed if no computer telephony calls have been made or received. An example of such a window is shown in FIG. 9F.

Figure 9G:
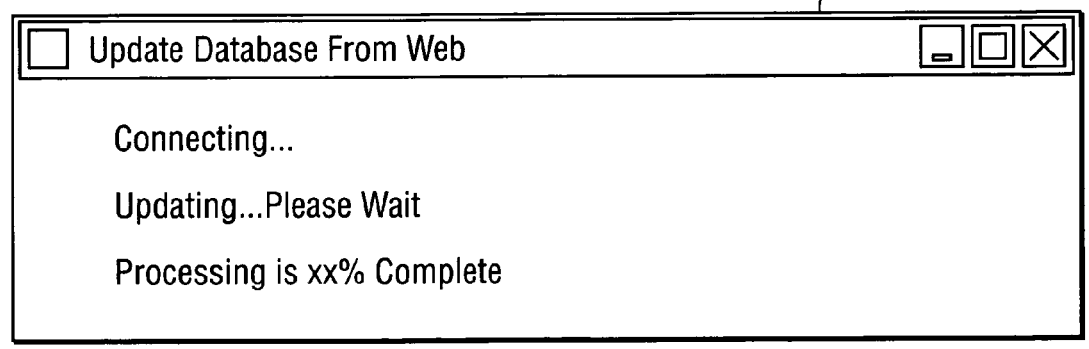

A menu item 511 in FIG. 9A allows a user to update the database from the Web (or Internet). As mentioned previously, there can be known techniques for deferring and resuming common background processes. Information on common background processes can be downloaded from the manufacturer of a background computer process or from the developer of the computer telephony application. FIG. 9G shows an example of a window that can be displayed to the user in order to indicate the process of downloading the new database information.

While the above is a complete description of an exemplary embodiments of the invention, there is alternatives, modifications and equivalents can be used. It should be evident that the invention is equally applicable by making appropriate modifications to the embodiments described above. For example, the techniques described above for deferring execution of background processes can also advantageously applied in conjunction with other known techniques for improving the audio of computer telephony calls. Therefore, the above description should not be taken as limiting the scope of the invention that is defined by the metes and bounds of the following claims along with their full scope of equivalents.

What is claimed is:

1. A computer implemented method of processing a computer telephony call, comprising:
   deferring execution of at least one background process, the background process being a process that is not under immediate interactive control of a user;
   processing a computer telephony call;
   generating a log of background processes that execute during computer telephony calls; and
   displaying the log to a user for analysis.

2. The method of claim 1, wherein deferring execution of at least one background process is performed when a computer telephony application is executed.

3. The method of claim 1, wherein deferring execution of at least one background process is performed before making or receiving a computer telephony call.

4. The method of claim 1, wherein deferring execution of at least one background process is performed during the computer telephony call.

5. The method of claim 1, wherein deferring execution of at least one background process includes:
   accessing an inhibit list that lists background processes; and
   deferring execution of the background processes on the inhibit list.

6. The method of claim 5, wherein the inhibit list includes information regarding deferring execution of each background process on the inhibit list.

7. The method of claim 1, further comprising enabling execution of background processes if there have not been any computer telephony calls for a predetermined time.

8. The method of claim 7, wherein enabling execution of background processes includes:
   accessing an uninhibit list that lists background processes; and
   enabling execution of the background processes on the uninhibit list.

9. The method of claim 8, wherein the uninhibit list includes information regarding enabling execution of each background process on the uninhibit list.

10. The method of claim 1, further comprising:
    identifying a background process on the log; and
    adding the background process to the background processes that will have their execution deferred.

11. The method of claim 1, further comprising:
    enabling execution of background processes if there have not been any computer telephony calls for a predetermined time.

12. The method of claim 11, wherein deferring execution of at least one background process is performed when a computer telephony application is executed.

13. The method of claim 11, wherein deferring execution of at least one background process is performed before making or receiving a computer telephony call.

14. The method of claim 11, wherein deferring execution of at least one background process is performed during the computer telephony call.

15. The method of claim 11, wherein deferring execution of at least one background process includes:
    accessing an inhibit list that lists background processes; and
    deferring execution of the background processes on the inhibit list.

16. The method of claim 15, wherein the inhibit list includes information regarding deferring execution of each background process on the inhibit list.

17. The method of claim 11, wherein enabling execution of background processes includes:
    accessing an uninhibit list that lists background processes; and
    enabling execution of the background processes on the uninhibit list.

18. The method of claim 17, wherein the uninhibit list includes information regarding enabling execution of each background process on the uninhibit list.

19. A computer program product that processes a computer telephony call, comprising:
    computer code that defers execution of at least one background process, the at least one background process being a process that is not under immediate interactive control of a user;
    computer code that processes a computer telephony call;
    computer code that generates a log of background processes that execute during computer telephony calls;
    computer code that displays the log a to a user for analysis; and
    a computer readable medium that stores the computer codes.

20. The computer program product of claim 19, wherein the computer readable medium is a CD-ROM, floppy disk, tape, flash memory, system memory, hard drive, or a data signal embodied in a carrier wave.

21. A system, comprising:
    a processor; and a computer readable medium storing a computer program including computer code that defers execution of at least one background process; computer code that processes a computer telephony call; computer code that generates a log of background processes that execute during computer telephony calls; and computer code that displays the log a to a user for analysis.

22. The system of claim 21, wherein the computer readable medium is a CD-ROM, floppy disk, tape, flash memory, system memory, hard drive, or a data signal embodied in a carrier wave.

* * * * *